United States Patent Office 3,536,899
Patented Oct. 27, 1970

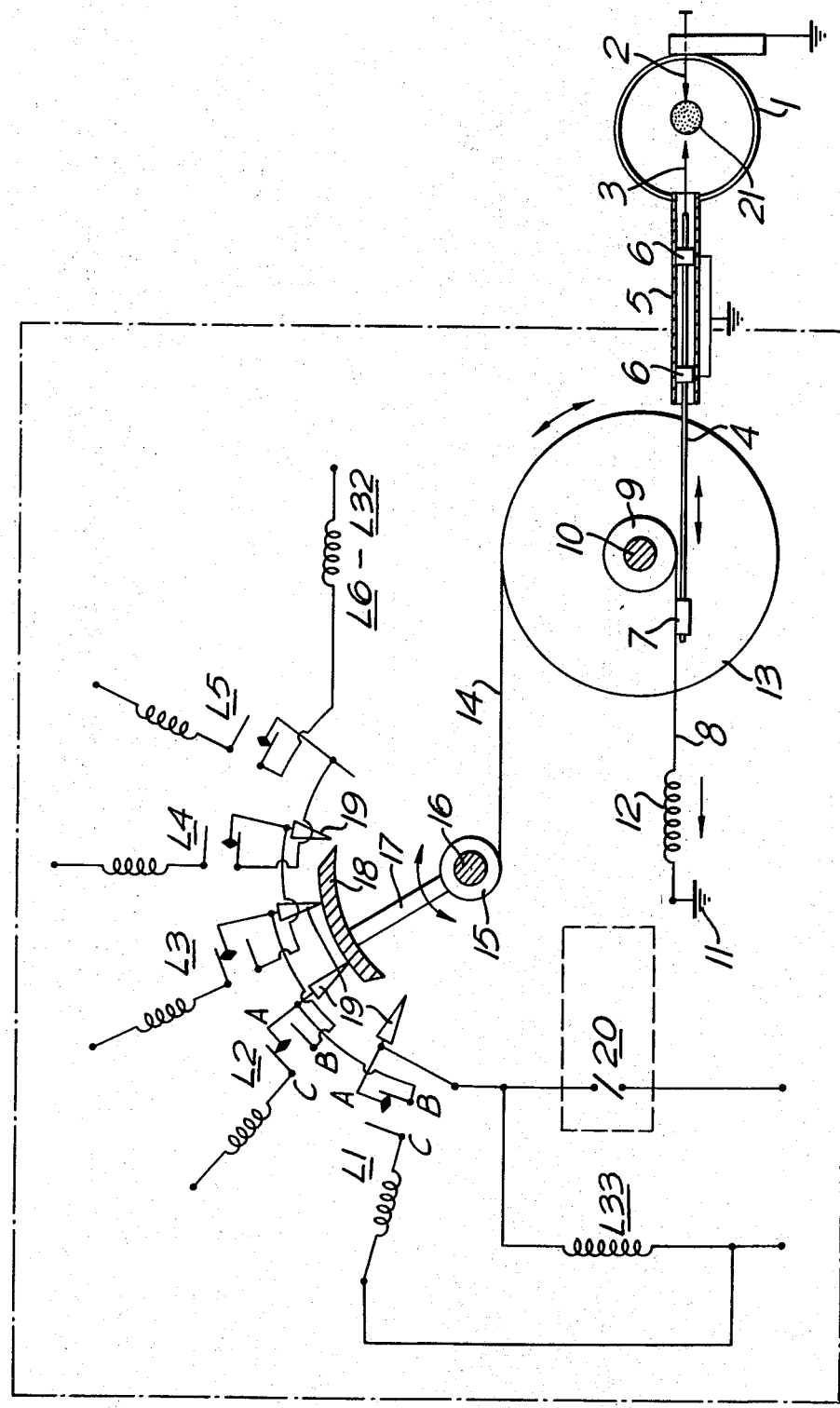

3,536,899
PARTICLE SIZE MEASURING AND
RECORDING APPARATUS
Peter Brian Knights, Roger Gavin Dingley, and Arthur Percy Shannon, Southampton, England, assignors to The International Synthetic Company Limited, Southampton, England, a corporation of the United Kingdom
Filed July 28, 1967, Ser. No. 656,753
Claims priority, application Great Britain, July 29, 1966, 34,245/66
Int. Cl. G06m *11/04;* G01n *15/00*
U.S. Cl. 235—92
4 Claims

ABSTRACT OF THE DISCLOSURE

Apparatus for use in measuring and recording the size of particles imaged on a photographic plate or print, including two pointers relatively movable towards and away from each other, a manually operated drive to impart such relative movement, a cam coupled to the drive and displaceable thereby in predetermined relationship according to the relative movement imparted to the pointers whereby the cam is selectively positioned according to the spacing of the pointers from each other, a plurality of counters selectively primed by the cam, each counter representing an increment of measurement and means to actuate the counter selectively primed by the cam.

---

This invention relates to an apparatus for use in measuring and recording the size of particles imaged on photographic plates or prints, the recorded information being presented numerically in the form of a size distribution analysis.

A conventional method of obtaining a size distribution analysis involves viewing individual particles through a graduated optical device and then manually recording each particle size. Analysis of the information obtained is possible only after counting the total number of particles examined and comparing this total with the number of particles in each size group. Satisfactory results are obtained by this method if the total number of particles is small, i.e. less than 100. However, when large numbers of particles have to be counted and grouped the heavy eye strain involved becomes a problem. This particularly applies if the variation in particle size of the particles is small as for example in the case of particles of a polystyrene latex. Apart from ultimate physical discomfort and possible long term damage to the vision of personnel engaged in counting work, the more immediate effects of this strain is to cause inaccuracies in the reading being taken. These inaccuracies can in turn cause an inaccurate size distribution analysis to be obtained. Increasing the power of the optical device can delay the onset of eye strain but increases the chances of omitting from the count, particles or even clusters of particles. A further disadvantage of this method is that a single analysis may involve several thousand particles and these can take many hours to group.

In known apparatus which simplifies the task of size distribution analysis whilst at the same time increasing the speed of the analysis without any decrease in accuracy, the operator matches the size of a light spot with that of the particle image. The size of the light spot is controlled by an adjustable iris diaphragm and the different diameters of the iris are correlated via a commutator with a number of counters each of which covers a range of iris diameters. Once the particle is sized, the operation of a foot switch causes the size diameter to be registered on the appropriate counter. However, the apparatus is rather complex and difficulties occur when trying to match the size of the spot with that of spherical imaged particles.

According to the present invention apparatus for use in measuring and recording the size of particles imaged on a photographic plate or print, includes two pointers relatively movable towards and away from each other, a manually operated drive to impart such relative movement, a cam coupled to the drive and displaceable thereby in a predetermined relationship according to the relative movement imparted to the pointers whereby the cam is selectively positioned according to the spacing of the pointers from each other, a plurality of counters selectively primed by the cam, each counter representing an increment of measurement and means to actuate the counter selectively primed by the cam.

Preferably one pointer is fixed and the other is movable both pointers being mounted in an open framework extending from a main housing of the apparatus. This mounting of the pointers ensures that the general light level reaching the eye remains approximately constant and at the same time facilitates the tracking of counted or uncounted particles.

A particular embodiment of the present invention is now described with reference to the accompanying schematic drawing which shows in side elevation a general layout of the apparatus.

The apparatus comprises two main units, a measuring head and a bank of counters, which units are preferably electrically coupled by a multi-core cable so as to allow the measuring head to be used on an inclined illuminated table.

Referring to the drawing, the measuring head comprises an open frame 1 in which are mounted two pointers 2, 3, and pointer 2 being fixed and the pointer 3 movable in a straight line relative thereto by means now to be described. The pointer 3 is secured to a rod 4 which passes through a guide 5 including friction-free bearings, for example, nylon bearings 6, the other end of the rod being secured at 7 to a band 8, one end of which passes around a pulley 9 mounted on a shaft 10; the other end of the band 8 is fixed at 11 with the interposition of spring means 12. Concentrically mounted on the shaft 10 is a pulley 13, the pulleys 9 and 13 rotating together around the shaft 10. Another drive band 14 is provided which is secured at one end to the pulley 13 and at the other to a pulley 15 fixed on a shaft 16, which carries means (not shown) whereby the shaft can be manually operated. The shaft also carries a cam shaft 17 coupled to a cam 18.

Rotation of the manual shaft 16 causes the cam shaft to move the cam 18 in a circular path around a series of counters. Each counter comprises a micro switch which includes a plunger 19 and three contacts A, B and C, and an electro mechanical register, there being preferably provided thirty-three such registers, L1, L2, etc., thirty of which represent adjacent size bands 0.02 centimetres wide, two of which show the number of counts outside the range of the apparatus, one for those below the minimum size and one for those above the maximum size, whilst the final remaining counter L33 records the total number of particles counted.

The micro switch plungers 19 are fitted with standard spring leaf actuators fitted with nylon rollers to enable the cam 18 to be given a sharp profile ensuring a negligible overlap of switched plungers when rotating the cam from clockwise to anti-clockwise, or vice versa, yet requiring very low operating torque.

Completion of the circuits through any of the micro switches is attained by a foot operated switch 20.

The length of the cam 18 is so selected that at least two micro switch plungers 19 are actuated at all times when the apparatus is in use. The microswitches are so interconnected that, although two are always actuated, only one of these at any one time can pass current to the electromechanical register.

The apparatus operates in the following manner. When it is desired to measure the size of a particle 21 which is previously positioned so that one part of its periphery is in register with the fixed pointer 2, the operator manually rotates the shaft 16 in a clockwise direction, as shown in the drawing, and such movement causes the pulley 15 to rotate in a clockwise direction and hence move the cam shaft 17 in a clockwise direction to move the cam 18 accordingly. This rotation also through the drive band 14 rotates the pulley 13 and hence shaft 10 and pulley 9 in an anti-clockwise direction, thereby moving the drive band 8 against the action of the spring 12 towards the right. This movement through the rod 4 moves the pointer 3 and the movement is continued until this pointer registers with the periphery of the particle 21 diametrically opposite the pointer 2. As soon as this occurs, the operator actuates the foot switch 20 which closes the electric circuit so as to send a pulse to the electromechanical register L33 and at the same time, sends a pulse to the micro switch L1; as the contacts A, C thereof are opened, current flows to L2. The contacts A, C of the micro switch L1 have opened because of actuation of the shaft 16 which moves the cam 18 out of register with the plunger 19 of L1 and into contact with plungers 19 of L2 and L3. Current, therefore, flows through contacts A and C of L2 to actuate its counting register; although plunger 19 of L3 is in contact with the cam, no current can flow through the micro switch L3, as the contacts A, B of L2 are opened. It will thus be seen that by such a construction, only one electromechanical register is connected during operation of the apparatus, the possibility of two being simultaneously connected, as explained above, being avoided.

It will be appreciated that by having another particle such as 21 of a size different from that shown the operator will have to impart a different amount of rotation, clockwise or anti-clockwise to the shaft 16, to move the pointer 3 towards or away from the pointer 2. According to the spacing of the pointers 2 and 3 from each other so the appropriate micro switch is actuated. At all times, however, the counter L33 is actuated every time the foot switch 20 is operated so that the total number of particles sized is recorded and each sizing is recorded by the electromechanical register according to size due to actuation of one of the micro switches L1 to L32.

The apparatus is preferably designed for measuring particles in the size range 0.1 to 0.7 centimetre. This range, however, can be increased or decreased simply by altering the reduction gear ratio between the pulleys 15 and 13, for example to a range of 0.1 to 1.4 centimetres.

What is claimed is:

1. Apparatus for use in measuring and recording the size of particles imaged on a photographic plate or print, including a first pointer, a movable second pointer mounted for linear movement towards and away from said first pointer, a manually rotatable pulley, a freely rotatable pulley, a first flexible band entrained around said manually rotatable pulley and said freely rotatable pulley, a further pulley coaxial and fast with said freely rotatable pulley, a second flexible band entrained around said further pulley and tangentially away therefrom along a straight line reach, resilient means to maintain said second flexible band under tension, said movable pointer being connected to said second flexible band at a location along the straight line reach thereof, a cam coupled to said manually rotatable pulley and displaceable thereby in predetermined relationship according to the relative movement imparted to the pointers whereby the cam is selectively positioned according to the spacing of said pointers from each other, a series of counters selectively primed by said cam, each counter representing an increment of measurement and means to actuate the counters selectively primed by said cam.

2. Apparatus according to claim 1 wherein the first flexible band is attached at one end to the manually rotatable pulley and at its other end to the freely rotatable pulley, said band being maintained under tension, by the aforesaid resilient means.

3. Apparatus according to claim 2 wherein the second flexible band is attached at one end to the further pulley and at its other end to a tension spring anchored to a main frame of the apparatus.

4. Apparatus according to claim 1 wherein the plurality of counters is arranged in a series and each counter comprises a microswitch and an electromechanical register, the microswitches of adjacent counters in the series being so interconnected that, although two are actuated by the cam upon it being selectively positioned, only one of the actuated microswitches can pass a current to its associated electromechanical register.

References Cited

UNITED STATES PATENTS

| 2,831,254 | 4/1958 | Phillips | 33—147 |
|---|---|---|---|
| 3,111,768 | 11/1963 | Leuschner | 33—178 |
| 3,199,729 | 8/1965 | Samp | 222—26 |
| 3,346,964 | 10/1967 | Schiller | 33—147 |

MAYNARD R. WILBUR, Primary Examiner

R. F. GNUSE, Assistant Examiner

U.S. Cl. X.R.

33—147; 356—102